April 24, 1962 A. H. ESCHENFELDER 3,031,341
HIGH DENSITY MAGNETIC RECORDING TAPE
Filed Jan. 23, 1958
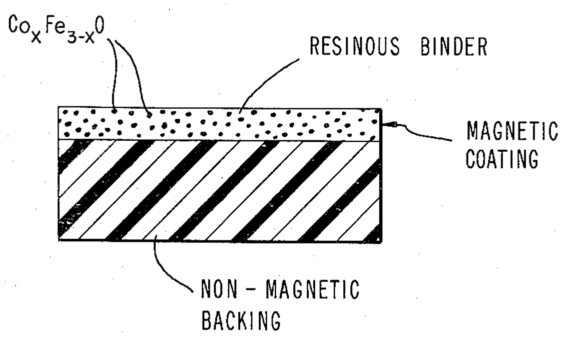
INVENTOR
ANDREW H. ESCHENFELDER
BY William J. Schelberg
AGENT

United States Patent Office 3,031,341

Patented Apr. 24, 1962

3,031,341

HIGH DENSITY MAGNETIC RECORDING TAPE

Andrew H. Eschenfelder, Poughkeepsie, N.Y., assignor to International Business Machines Corporation, New York, N.Y., a corporation of New York Filed Jan. 23, 1958, Ser. No. 710,600

4 Claims. (Cl. 117—138.8)

This invention relates to new and improved magnetic record members. More particularly, it relates to the use of magnetic ferrite compounds as the magnetic material in said members.

As is well known in the art, magnetic oxides of iron, such as magnetite, $Fe_3O_4$, or gamma ferric oxide, $\gamma$-$Fe_2O_3$, present in a state of subdivision of the order of one micron, have been used extensively in magnetic record members such as magnetic tapes. Magnetic tapes prepared using these compounds show a marked decline in signal output response at high values of frequency or bit density. The observed fall-off becomes appreciable at densities greater than about 1,600 bits per inch. This variation in signal output with bit density has been found to limit the useful range of operation of magnetic tapes as memory storage elements in computers and other data handling mechanisms.

Accordingly, an object of this invention is to provide magnetic materials which have more desirable magnetic properties for use in magnetic record members.

A further object of this inventoin is to provide a magnetic recording tape which exhibits a relatively constant signal output over a wide range of bit densities.

Another object is to provide a new and improved magnetic record member.

Other objectives will be pointed out in the following description and claims which disclose, by way of example, the principle of invention and the best manner which has been contemplated of applying that principle.

The drop-off in output signal with increasing bit density in magnetic tapes may be ascribed to a decrease in remanent induction caused by a "shearing" effect. Each bit on a tape of thickness $t$ can be regarded as a prolate ellipsoid of axial ratio $t/d$, where $d$ is the length of the bit. The shape demagnetizing factor of a bit of this shape depends on the length to width ratio and is proportional to the square of this ratio over wide ranges, as shown in Bozorth's "Ferromagnetism," Van Nostrand and Co. (1951) on p. 849. The effective remanent induction is given by the intersection of the shearing line (whose slope is proportional to the demagnetizing factor) and the demagnetizing portion of the hysteresis loop of the magnetic particles. The essential idea of this invention is to increase the coercive force of the particles so that the slope of the shearing line and therefore the bit density, can be increased for any given equivalent demagnetization. For single-domain tape particles the rotational coercive force is approximately determined by the ratio of twice the first order anisotropy constant, $2K_1$, to the saturation magnetization, $M_s$. Applicant has found that certain ferrite compounds exhibit a workable range of values of magnetic properties, and in particular a higher coercive force, for use in magnetic tapes. The substitution of even small amounts of cobalt for iron in magnetite, for example, results in a cobalt-iron ferrite having a higher coercive force than magnetite itself. Other compounds which possess desired magnetic properties leading to high coercive forces are nickel ferrite $NiFe_2F_4$, $K_1=-6.2\times10^4$ ergs/cm.$^3$ and $M_s=270$ gausses at 300° K. and cobalt ferrite, $CoFe_2O_4$, $K_1=+3.3\times10^6$ and $M_s=400$, and cobalt nickel ferrite, $Co_xNi_{1-x}Fe_2O_4$.

A preferred embodiment of this invention, according to which substantial improvements have been made over existing magnetic tapes, comprises using cobalt iron ferrites of the general formula $Co_xFe_{3-x}O_4$ where $x$ ranges from about 0.04 to 1 as the magnetic material in said tapes. Accordingly, magnetic tapes with these materials were prepared by forming a mixture of finely ground particles of cobalt oxide and magnetite in predetermined proportions, sintering at elevated temperatures in air, in the order of 1000–1500° C., subsequently grinding the sintered mass to fine particles of about one micron, mixing with a binder, such as polyvinyl chloride, grinding for 14 days in a ball mill or 48 hours in an attritor, and coating onto a backing material, such as mylar film having a thickness of about 1½ mils. Different binders and backings may be used according to the procedures described in a copending application Serial No. 703,751, filed December 19, 1957, now Patent No. 2,989,415, which is assigned to the assignee of this application.

In the drawing there is shown a cross section of a piece of magnetic tape. On the non-magnetic backing is the magnetic coating comprising fine particles of $$Co_xFe_{3-x}O_x$$

and a resinous binder.

*Example I*

Following the general procedure described above, a magnetic tape having a coating thickness of 0.13 mil was fabricated using $Co_{.15}Fe_{2.85}O_4$ as the magnetic material. A frequency response characteristic curve run at saturating current showed a decline in signal output voltage from 12.0 to 10.5 millivolts over the range of 200 to 3,000 bits per inch, a variation of only 12.5%. At 2,600 bits per inch, the drop-off was only 10%. A similarly prepared tape of the same thickness using $Fe_3O_4$ as the magnetic constituent gave a drop-off in signal output over the same range of 24.6%, or 12.4% more than the corresponding cobalt-iron ferrite containing magnetic tape. The 10% drop-off point occurred at 2,000 bits per inch.

*Example II*

A magnetic tape having a coating thickness of 0.33 mil was prepared using $Co_{0.15}Fe_{2.85}O_4$ as the magnetic constituent. A frequency response characteristic curve was run at saturating current over the range from 200 to 3,000 bits per inch. The signal output voltage delivered ranged from 16.0 to 9.0 millivolts, a variation of 43.8%. A similarly prepared magnetic tape of the same thickness using magnetite gave a drop-off in signal output from 17.0 to 6.0 millivolts over the same range, a decline of 65%.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic recording member having a substantially constant signal output at relatively high information bit densities, comprising a non-magnetic backing and a magnetic coating firmly attached thereto, said coating being a uniform dispersion of fine magnetic particles in a resinous binder material, said coating essentially of cobalt-iron ferrite derived from magnetite within the composition range $CO_xFe_{3-x}O_4$ where $x$ ranges from 0.04 to 0.30.

2. A magnetic recording tape having a substantially constant signal output at relatively high information bit densities comprising non-magnetic backing and a magnetic coating firmly attached thereto, said coating being a uniform dispersion of fine magnetic particles in a resinous binder material, said coating consisting essentially of a cobalt-iron ferrite derived from magnetite having the formula $Co_{0.15}Fe_{2.85}O_4$.

3. A magnetic recording tape having a substantially constant signal output at relatively high information bit densities comprising non-magnetic backing and a magnetic coating firmly attached thereto, said coating being a uniform dispersion of fine magnetic particles in a resinous binder material, said coating consisting essentially of a cobalt-iron ferrite derived from magnetite having the formula $Co_{0.15}Fe_{2.85}O_4$, which is present in the state of subdivision of the order of one micron.

4. A magnetic recording tape having substantially constant signal output characteristics in the range from 200 to 3,000 bits per inch at a coating thickness of less than 0.2 mil, comprising a thin flexible non-magnetic backing and a magnetic coating firmly attached thereto, said coating being a uniform dispersion of fine magnetic particles in a resinous binder material, said coating consisting essentially of cobalt-iron ferrite derived from magnetite having the formula $Co_{0.15}Fe_{2.85}O_4$.

References Cited in the file of this patent

UNITED STATES PATENTS

| | | |
|---|---|---|
| 2,594,893 | Faus | Apr. 29, 1952 |
| 2,656,319 | Berge | Oct. 20, 1953 |

FOREIGN PATENTS

| | | |
|---|---|---|
| 644,639 | Great Britain | Oct. 18, 1950 |
| 510,462 | Belgium | Apr. 30, 1952 |
| 679,453 | Great Britain | Sept. 17, 1952 |
| 717,269 | Great Britain | Oct. 27, 1954 |
| 721,630 | Great Britain | Jan. 12, 1955 |
| 752,156 | Great Britain | July 4, 1956 |